Figure 1:
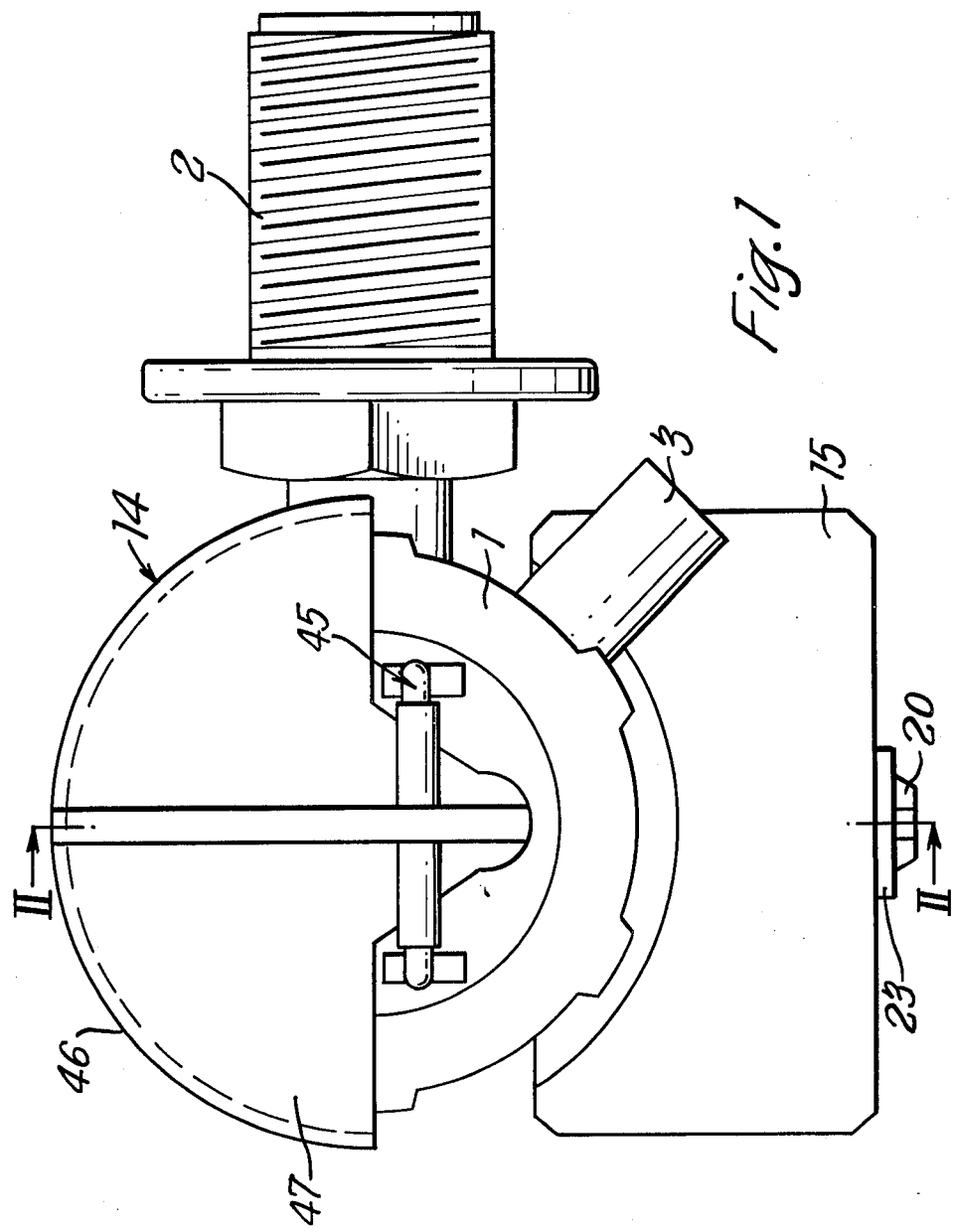

United States Patent [19]

Thompson

[11] 4,027,693
[45] June 7, 1977

[54] FLOAT CONTROLLED VALVES

[75] Inventor: Martin C. Thompson, Maidstone, England

[73] Assignee: Reed International Limited, London, England

[22] Filed: Apr. 25, 1975

[21] Appl. No.: 571,660

[52] U.S. Cl. .............................. 137/414; 137/426; 251/45

[51] Int. Cl.² .......................................... F16K 31/18

[58] Field of Search .......... 137/412, 413, 414, 426, 137/416, 418, 448, 451; 251/45, 46, 61, 61.1, 61.2, 234

[56] References Cited

UNITED STATES PATENTS

| 2,240,102 | 4/1941 | Textor | 137/414 |
|---|---|---|---|
| 3,242,940 | 3/1966 | Sirotek | 137/414 |
| 3,268,204 | 8/1966 | Grove | 251/234 |
| 3,285,277 | 11/1966 | Goldtrap | 137/414 |
| 3,457,947 | 7/1969 | Fitzgerald | 137/418 |
| 3,554,219 | 1/1971 | Hudson | 137/414 |
| 3,763,881 | 10/1973 | Jones | 137/414 |
| 3,811,464 | 7/1972 | Esten | 137/414 |
| 3,863,670 | 2/1975 | Yeagle | 251/234 |

Primary Examiner—Martin P. Schwadron
Assistant Examiner—G. L. Walton
Attorney, Agent, or Firm—Pollock, Vande Sande & Priddy

[57] ABSTRACT

A float controlled valve for controlling the flow of a pressurized water supply to a cistern, is of the kind having a flexible diaphragm dividing a valve housing into an inlet chamber and a back-pressure chamber, the pressurized supply acting on both sides of the diaphragm to maintain the valve closed. A float controlled pilot valve is pivotally connected to the valve housing and is operable by the float to relieve the pressure in the back pressure chamber. The float operated pilot valve has an actuating lever which is pivoted at one end to the valve housing and carries the float at its other end, the lever being shaped to extend from its float-carrying end up one side of the valve housing and over the top of the valve housing to its pivotal connection at the opposite side of the valve housing.

5 Claims, 3 Drawing Figures

Fig. 2

FLOAT CONTROLLED VALVES

This invention relates to float controlled valves, more particularly, but not exclusively, for use in water cisterns for controlling a pressurized water supply to the cistern whereby to maintain the water in the cistern at a substantially constant level.

The valve construction with which the present invention is concerned is of the kind having a valve housing in which is located a flexible diaphragm carrying a valve member arranged to engage a valve seating to close the valve, the diaphragm dividing the housing into an inlet chamber and a back pressure chamber in communication with each other whereby the pressurized supply acts on both sides of the diaphragm and provides a resultant force urging the valve member towards the valve seating, and a float-operated pilot valve controlling an outlet port in the back pressure chamber, whereby the back pressure can be relieved to permit the valve member to move away from its seating.

According to the present invention, the float operated pilot valve has an actuating lever arm which is pivoted at one end to the valve housing and is adapted to carry a float at its other end, the lever arm being shaped to extend from its float carrying end up one side of the valve housing and over the top of the valve housing to its pivotal connection at the opposite side of the valve housing. This arrangement enables the float to be positioned directly beneath the valve housing so that the overall volume occupied by the valve can be kept small.

Preferably the lever arm in its extension over the top of the valve housing is formed as a shroud for the valve housing. This prevents any liquid from spraying about the top of the valve and also advantageously forms a stiff lever arm.

Figure 3:
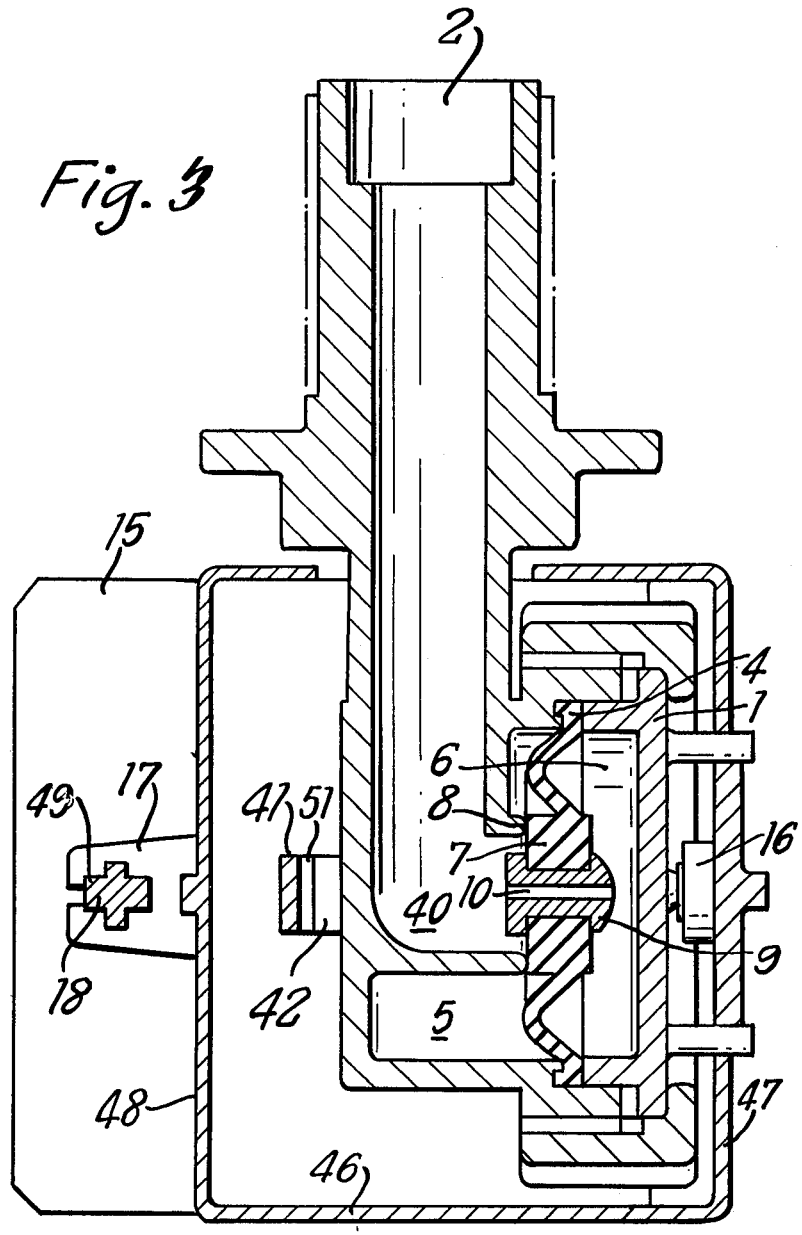

One valve construction in accordance with the invention will now be described by way of example with reference to the accompanying drawings in which:

FIG. 1 is a side elevation of the valve,
FIG. 2 is a section on the line II—II in FIG. 1, and
FIG. 3 is a section on the line III—III in FIG. 2.

The valve has a valve housing 1 provided with an inlet port 2 and an outlet port 3. A flexible diaphragm 4 is mounted within the housing 1 to divide the housing into an inlet chamber 40 and a through-flow chamber 5 on one side of the diaphragm 4 and a back-pressure chamber 6 on the other side of the diaphragm 4. The central part of the diaphragm 4 is formed as a valve member 7 which engages seat 8 to close off the inlet chamber from the through-flow chamber 5 and so effectively close off the inlet port 2 from the outlet port 3. Located at the centre of the diaphragm is a bushing 9 having an axial bore 10 which connects the inlet chamber 40 with the back pressure chamber 6. Thus the back pressure chamber 6 is filled with water, and provided no water is escaping from the chamber 6, the same pressure is applied to both sides of the diaphragm. However the operative area of the diaphragm on the side in the back pressure chamber 6 is greater than the operative area on the side in the inlet chamber 40 so that under these conditions the valve member 7 is urged against its seat 8.

The back-pressure chamber 6 has a port 12 controlled by a float operated pilot valve 13. The pilot valve has a lever arm 14 pivoted trunnion fashion at 45 to the valve housing 1 adjacent the port 12 (see FIG. 1) and carrying at its other end float 15. The closing of the port 12 is effected by a rubber bung 16 mounted in a recess in the arm 14. The lever arm 14 extends from its pivotal mounting 45 up one side of the valve housing 1 and then down its opposite side. The part of the lever arm 14 extending over the top of the valve housing 1 is in the form of a semi-cylindrical shroud 46 and the parts of the lever arm 14 extending down opposite sides of the valve housing 1 constitute end walls 47 and 48 for the shroud 46. The end wall 48 is provided with a pair of forked lugs 17 for receiving a float attachment rod 18 which is a snap fit in the lugs 17. The float attachment rod 18 is of cruciform section and the lugs 17 define a correspondingly shaped aperture for receiving the rod 18. The rod 18 also has a vertical series of ribs 49 and the lugs 17 locate between adjacent ribs 49 so that the rod 18 is restrained against vertical movement relatively to the lugs 17. Vertical adjustment of the rod 18 and hence of the float 15 is effected by re-locating the lugs 17 between different ribs 49 on the rod 18.

The lever arm 14 has a clip 41 attached to it. This clip 41 is in the form of a flexible arm extending downwardly from the underside of the shroud 46 and formed with an inclined shoulder 51 which engages with a projection 42 on the valve housing 1. The geometry between the clip 41 and the projection 42 is so arranged that as the float 15 moves upwards, the shoulder 51 of the clip 41 engages the underside of the projection 42 causing the float to be held down while the valve 13 is still open. When the float is sufficiently submerged it exerts an upthrust sufficient to cause the clip 41 to flex over the projection 42, allowing the float to move up rapidly and shut off port 12.

If this clip arrangement is not provided, the float follows the water level as it rises and partially closes port 12 long before the water level has reached its desired upper limit. This partial closure of the port 12 causes an increase in the pressure in chamber 6 causing the diaphragm 4 to partially close the valve. This means that the flow through the valve is reduced and the valve is in operation over an extended time. By the inclusion of the clip arrangement, the shut off action of the valve is prevented until the last possible moment and then occurs very rapidly.

The float 15 extends beneath the valve housing 1 and is secured to the rod 18 by a clip 20 at the lower end of the rod 18. A flanged sleeve 23 locates in a recess in the float 15 and prevents e.g. by splining, rotation of the float 15 about the sleeve. The sleeve 23 is held against rotation on the rod 18 by means of a square hole through it engaging snugly a squared section on the end of rod 18. Thus the float is effectively clamped in position between flange 22 on the rod 18 and the flange of sleeve 23.

One cycle of operation of the valve will now be briefly described. Assuming the valve to be initially in the position shown in the drawings, i.e. with the outlet port 3 closed off by the valve member 7 and the cistern in which the valve is fitted filled to the desired level. If the level in the cistern falls, the float 15 will drop causing the lever arm to rotate on its pivot to open port 12. This allows liquid to flow out of the back pressure chamber 6 and relieve the back pressure, so that the forward pressure acting on the other side of the diaphragm causes the diaphragm to flex to move the valve member 7 to its open position. Liquid then flows from the inlet 2 to outlet 3 to fill the cistern and the float 15 begins to rise.

Eventually the float reaches the level where the clip 41 engages the projection 42 on the valve housing 1. The float 15 is then held until sufficient water has been displaced to cause an upthrust on the float sufficient to flex the clip 41 over the projection 42. The float then moves upwardly and the port 12 is shut off. The back pressure in the chamber 6 then begins to rise as a result of the continual flow of liquid through the axial bore 10 and eventually reaches a value which, due to the larger operative area of the diaphragm on the side within the back pressure chamber, causes flexing of the diaphragm to cause the valve member 7 to move to its closed position against seating 8 to close off outlet port 3. Hence the valve has returned to the position shown in the drawings ready for another cycle of operation.

The complete valve assembly including the lever arm and float attachment rod can be manufactured from plastics materials by injection moulding. The port 12 and the bore 10 can be made relatively large to decrease the likelihood of clogging with deposits. As can be seen, the outlet port 3 has a smaller area than inlet port 2 to cause partial pressurization of the through flow chamber 5 when valve member 7 is open. Thus when the diaphragm 4 moves the valve member 7 to the closed position, the pressurization reduces the speed of closure movement. This prevents hydraulic shocks (backhammer) being set up in the system. The outlet port 3, as can be seen from FIG. 1, is angled away from the valve housing 1, and by positioning of the valve in a cistern, the outflow from the valve can be directed against the side of the cistern to give silent flow and a controlled air gap to prevent contamination of the system by back syphonage of soiled liquid.

Alternatively, the outlet port 3 may be positioned above the enter line of the valve body 1 and fitted with a suitable back syphonage device, such as a non-return valve.

By forming the lever arm 14 as a shroud over the top of the valve housing 1, liquid is effectively prevented from spraying out of the top of the cistern when port 12 is partially opened or closed. A lever arm of this form is also very stiff.

The float 15 may be manufactured from low floatation material since the force required to close port 12 is relatively small. Also the valve overall is very small and the total volume it occupies is also kept small by mounting the float directly beneath the valve housing 1, hence giving the cistern designer more scope.

I claim:

1. A float-controlled valve comprising:
   a valve housing defining inlet and outlet ports,
   a flexible diaphragm supported in said housing and dividing said housing into an inlet chamber and a back-pressure chamber which communicate with each other through a small port,
   a valve member carried by said diaphragm for selectively permitting flow between said inlet and outlet ports,
   a pilot valve controlling an outlet port in said back-pressure chamber,
   a shroud member of generally semi-cylindrical configuration covering said housing and being pivotally mounted,
   and an actuating lever extending generally parallel to the axis of said shroud member and supporting a float,
   said pilot valve also being supported on said shroud member substantially diametrically opposite said actuating lever.

2. The valve of claim 1 wherein said valve member has an aperture therein to form said small port.

3. The valve of claim 1 wherein said float is connected to said actuating lever via a float attachment and whose position is adjustable on said actuation lever to vary the height of the float.

4. A float controlled valve according to claim 3, wherein said actuating lever has a pair of forked lugs in which the float attachment rod is a snap fit, the float attachment rod having a vertical series of ribs spaced to receive the lugs adjacent ribs.

5. A float controlled valve according to claim 1, wherein the outlet port in the valve housing is of smaller cross-sectional area than the inlet port of the valve housing.

* * * * *